June 22, 1965

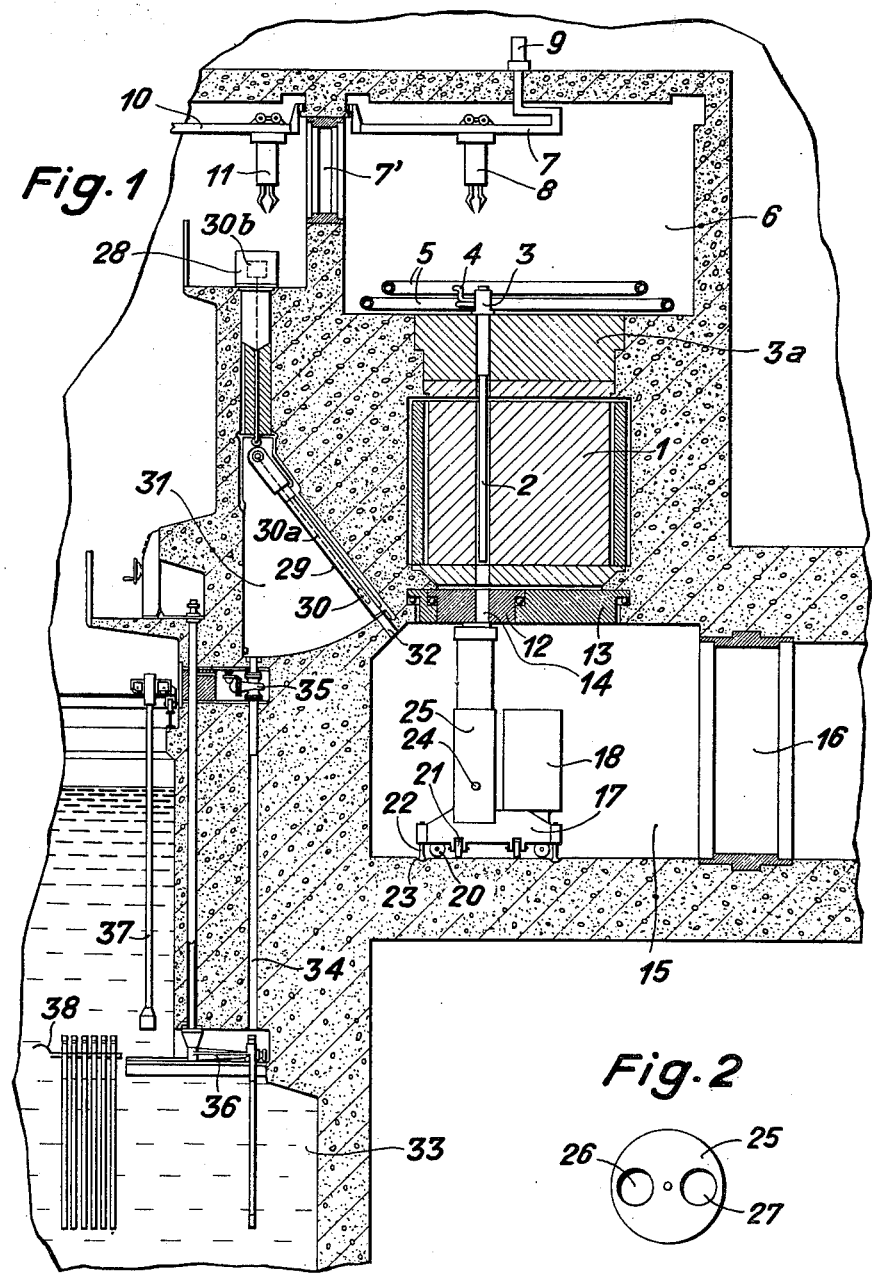

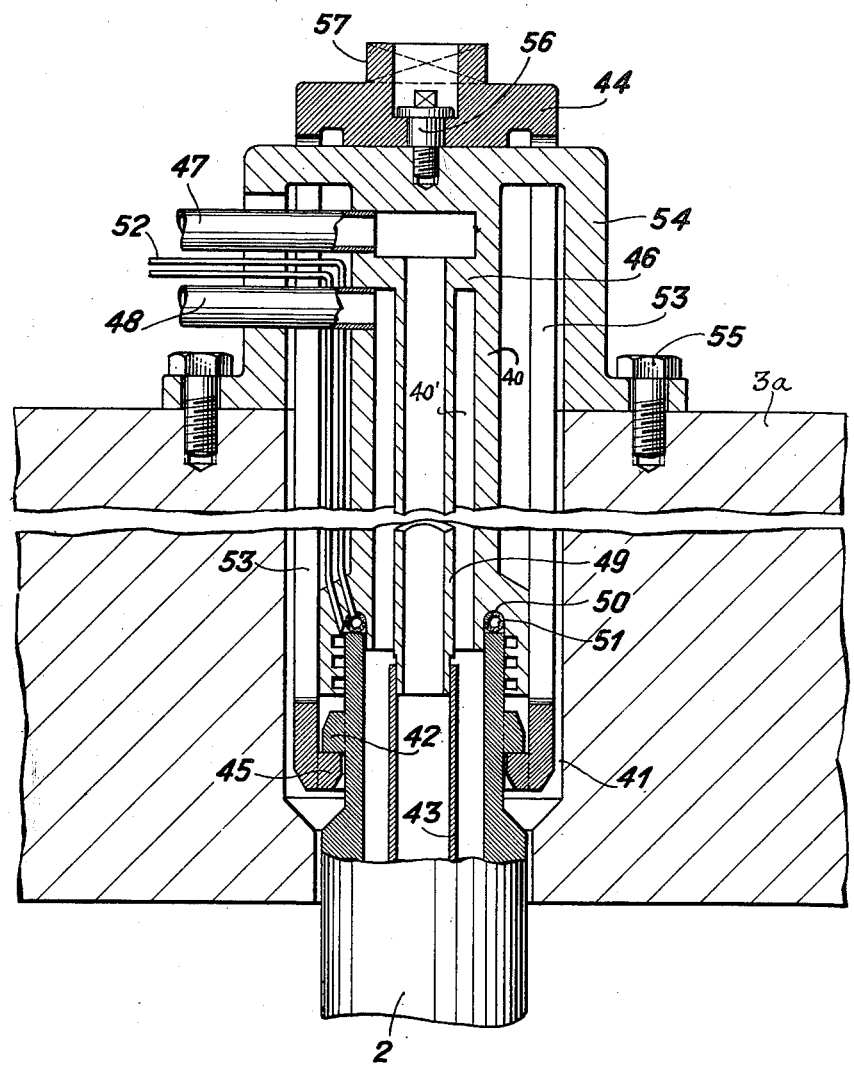

E. STRAUB ETAL 3,190,805

FUEL ELEMENT CHANGING AND TRANSPORTING APPARATUS FOR NUCLEAR REACTORS

Filed Jan. 30, 1961

Inventors
EDWIN STRAUB
ERNST BOSSHARD
By K. A. Mayr
Attorney:

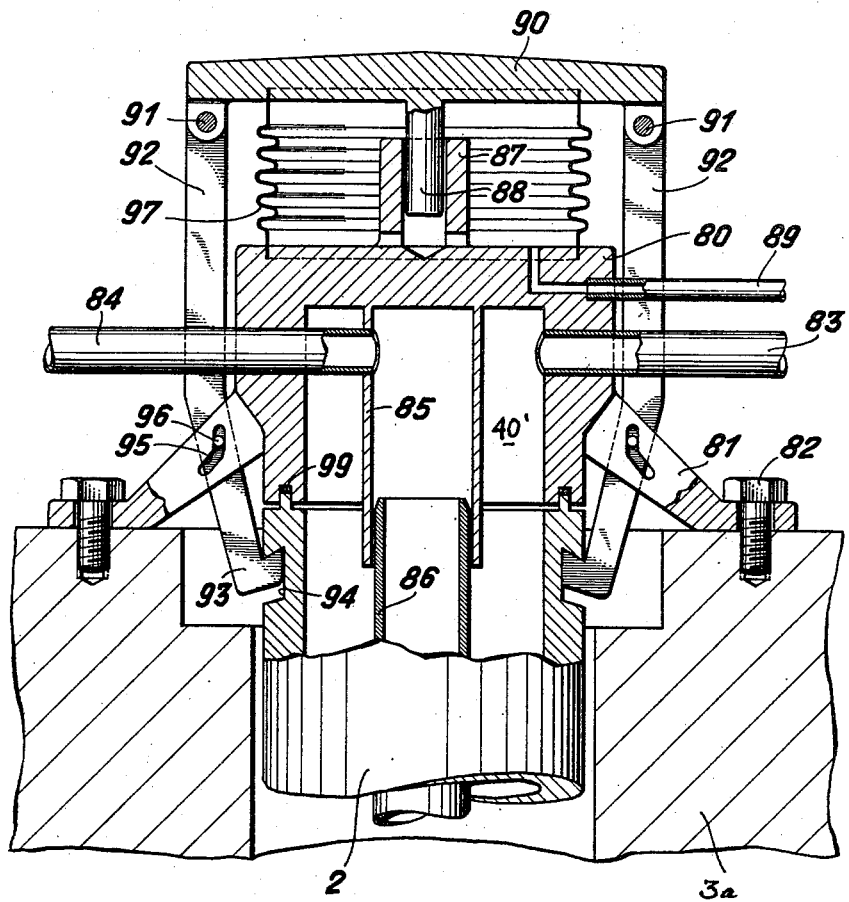

United States Patent Office 3,190,805
Patented June 22, 1965

3,190,805
FUEL ELEMENT CHANGING AND TRANSPORTING APPARATUS FOR NUCLEAR REACTORS
Edwin Straub, Frauenfeld and Ernst Bosshard, Winterthur, Switzerland, assignors to Sulzer Frères, S.A., Winterthur, Switzerland, a corporation of Switzerland
Filed Jan. 30, 1961, Ser. No. 85,891
Claims priority, application Switzerland, Feb. 12, 1960, 1,592/60
12 Claims. (Cl. 176—30)

The invention relates to a nuclear reactor wherein rodlike elements containing fissionable material are placed in apertures in a moderator unit and pipes are connected to the individual elements for conducting a coolant.

In such reactors it is known to introduce the fuel elements from the side where the coolant conduit connections are placed, the spent elements being withdrawn and replaced by new elements from the same side. Since the coolant piping connections are disposed in contaminated inaccessible chambers a complicated remotely controlled apparatus is required to release the coolant conduits from the fuel elements and to replace the latter. The matter is particularly difficult because all apparatus of this kind must be absolutely reliable in operation and special safety devices and interlocks must be provided for each operation. Nuclear reactors of the kind specified are also known wherein the fuel elements are introduced into the reactor core from one side and removed therefrom on the other side. This feature alone, however, does not simplify the handling and operating machinery.

It is an object of the invention to provide a nuclear reactor so arranged that the mechanical apparatus required to replace spent fuel elements can be simplified considerably and the safety of the apparatus, and therefore of the entire reactor, can be considerably increased.

To obtain this object, the apparatus according to the invention comprises connecting members for the coolant-conveying pipes which members are combined with retaining means for the fuel elements and are disposed on one side of the moderator unit, while a changing apparatus adapted to introduce and withdraw the fuel elements is disposed on the opposite side of the moderator unit.

The novel features which are considered characteristic of the invention are set forth with particularity in the appended claims. The invention itself, however, and additional objects and advantages thereof will best be understood from the following description of embodiments thereof when read in connection with the accompanying drawing wherein:

FIG. 1 is a schematic vertical section of a nuclear reactor including a fuel element changing and transporting apparatus according to the invention.

FIG. 2 is a large scale top view of a part of the fuel element exchanging and transport apparatus shown in FIG. 1.

FIG. 3 is a schematic vertical sectional illustration of a head unit forming part of a fuel element changing mechanism according to the invention.

FIG. 6 is a vertical part sectional view of a modified head unit forming part of a mechanism for exchanging fuel elements.

Figure 4:
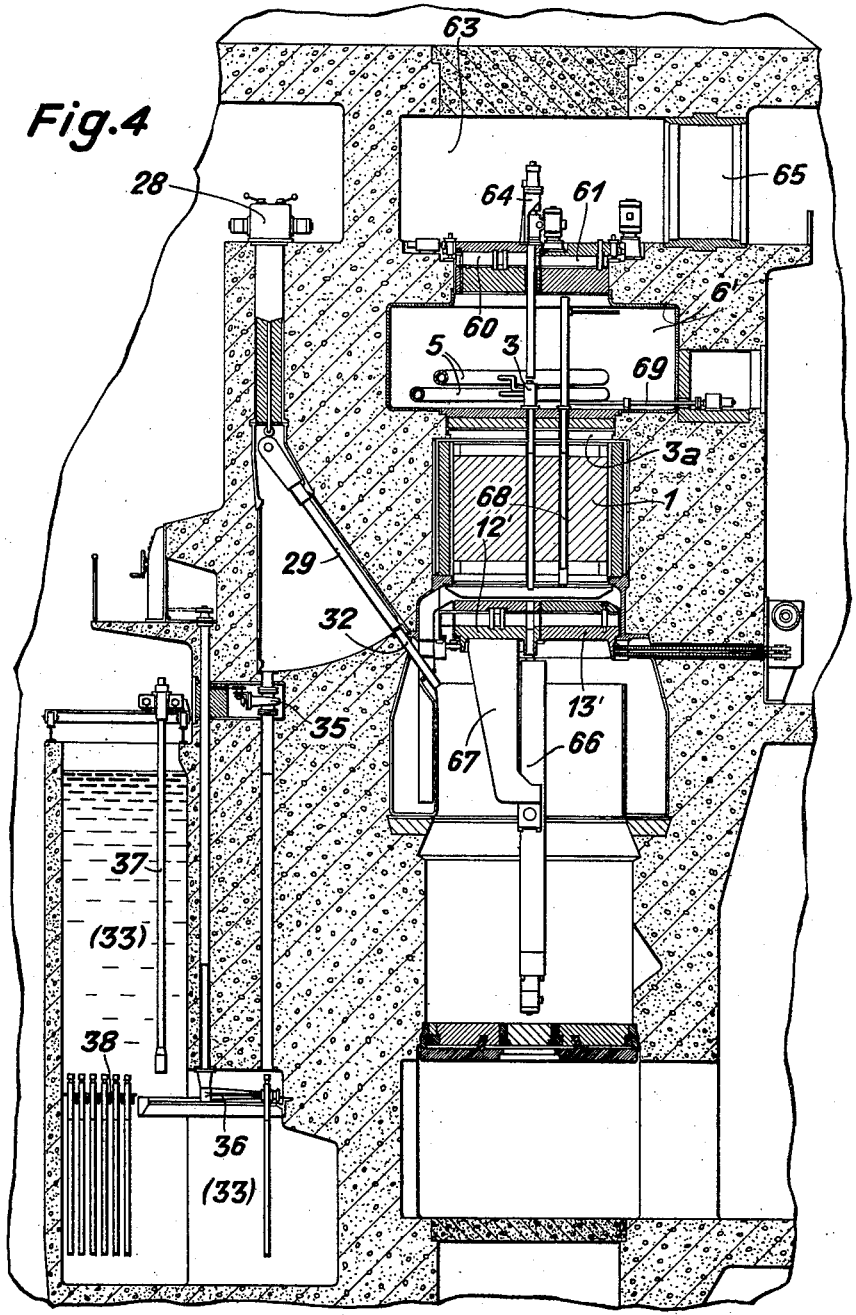
FIG. 4 is a schematic vertical sectional view of a nuclear reactor including a modified fuel element changing and transporting apparatus.

Referring to FIG. 1 of the drawing, a moderator block 1 is pierced with a plurality of parallel bores in which are placed tubular fissionable elements 2. To make the drawing clear, only a single element 2 is shown. The elements 2 are secured in connection heads 3 to which pipes 4 are connected for supplying to and removing a coolant from the elements 2. The pipes 4 are connected to headers 5 which supply and return the coolant to and from heat exchangers, not shown. The head units 3 are disposed together with the pipes 4 and the headers 5 in a chamber 6 shielded by a radiation-proof cover 3a. A carrier 7 is rotatably supported at 9 above the heads 3 in the chamber 6 and movably supports a manipulator 8. By rotating the carrier 7 and moving the manipulator 8 thereon any desired head 3 can be reached. The chamber 6 is provided with a radiation-proof door 7'. Near the door 7' a spare manipulator 11, which can be interchanged with the manipulator 8, is movable on a track 10. Below the moderator unit 1 is a closure shield comprising two rotatable members 12, 13. The member 12 is mounted for eccentric rotation in the member 13 and is provided with an eccentric aperture 14 through which an element 2 can pass. The aperture 14 can be moved below any of the elements 2 by rotating the members 12 and 13 relatively to one another. Disposed below the two members 12 and 13 is a chamber 15 which is accessible through a radiation-proof door 16. Since the chamber 15 is shielded from the reactor core by the members 12, 13, an apapratus 17 for replacing spent fuel elements by new elements can move through the chamber 15 when the reactor has been shut down. The apparatus 17 comprises a radiation-proof cab 18 for the operator and has wheels 20, 21 permitting movement of the apparatus in two directions which are normal to each other. For instance, when the wheels 20 are in use the wheels 21 are raised by a lifting mechanism, not shown, and vice versa. The apparatus 17 may be provided with supports 22 which are adapted to drop into cavities 23 in the floor of the chamber 15 for fixing the apparatus 17 below the fuel element 2 which must be changed. The apparatus 17 comprises a cylinder 25 which can be rotated around a vertical axis and rocked on horizontal pivots 24. The cylinder 25 is preferably made of a radiation-proof substance and is provided on top with apertures 26, 27 (FIG. 2) through which elements of a lifting mechanism, not shown, which may be, for instance, hydraulic, can penetrate into the apertures 14 and which are adapted to lift fuel elements 2 in the apertures 26 or 27 into their operative position in the moderator unit 1 or to lower a fuel element, which must be replaced, out of the unit 1 into one of the apertures in the cylinder 25. Disposed laterally of the reactor core is a rockable hollow arm 29 which is actuated by a mechanism 28 and which contains a mechanism for longitudinally moving a gripper 30 inside the arm. When the latter is in the position shown in FIG. 1 and registers with a hole 32 in the concrete shield surrounding the reactor, the gripper 30 can be advanced into the chamber 15 and receive a fuel element from the apparatus 17 and place the element in the arm 29. The mechanism for moving the gripper 30 is indicated in the form of a rope 30a and a hoisting drum 30b. The arm 29 swings in a chamber 31 which is connected to a storage chamber 33 by a channel 34 which can be closed by a closure member 35. Below the channel 34 is a conveyor 36 for transporting the elements 2 removed from the reactor to a crane 37. The latter can convey the individual elements 2 to an underwater storage apparatus 38.

To change a fuel element, the associated coolant conduit is closed and the shielding members 12, 13 are rotated until the aperture 14 is below the element 2 which must be removed. The mechanism in one of the apertures 26 or 27 in the cylinder 25 which is disposed below the respective fuel element is operated to support the fuel element from below. The head 3 of the fuel element which must be removed is released by the manipulator 8 from the fuel element and the latter is lowered into the respective aperture 26 or 27 in the cylinder 25. Thereupon the cylinder 25 is pivoted and the apparatus 17 is moved into a position in which the aperture in which the element 2 is received is opposite the aperture 32, whereafter the element 2 is engaged by the gripper 30 protruding from the arm 29 and pulled thereinto. The arm 29 is then swung to register with the channel 34. While the member 35 is held in open position, the fuel element is lowered through the channel 34 and transferred to the conveyor 36 which moves the element 2 below the crane 37 for transporting the element 2 to the storage apparatus 38. A new element 2 to be installed in the reactor travels over the same route in the converse direction. It is transferred from the crane 37 to the conveyor 36, lifted into the arm 29 which delivers the new element through the hole 32 and through one of the apertures 26, 27 into the cylinder 25. The latter is then swung into the vertical position and the apparatus 17 is moved to the position where the respective aperture 26 or 27 registers with the aperture 14 in the member 12 so that the new element can be raised to the correct position in the moderator block 1. The corresponding head 3 is then connected to the element 2 by the manipulator 8 and the coolant flow through the pipes 4 is started.

To reduce the number of movements which the apparatus 17 must make during a fuel-rod-changing operation the apparatus 17 is provided, as already specified, with a rotatable cylinder 25 having two apertures 26 and 27. This makes it possible to first place a new element into one of the apertures 26 or 27 by the rockable arm 29, whereafter the apparatus 17 can be moved below the reactor core so that the spent element 2 which must be removed can be lowered into the second aperture, which is empty. Thereupon the cylinder 25 can be rotated around its vertical axis and the new element introduced into the moderator unit 1 without changing the position of the apparatus 17. Once the new element has been secured by the manipulator 8, the old rod can be removed to the storage chamber by the procedure described, by means of the arm 29, the conveyor 36 and the crane 37.

FIG. 3 is a detailed illustration of the connecting head 3 shown in FIG. 1. The radiation-proof cover 3a disposed above the reactor core is formed with apertures 41 adapted to receive the ends of the elements 2. The outsides of the latter are provided with radial protuberances 42 cooperating with inside protuberances 45 of a hollow retainer 44 as is known in bayonet connections. A coolant tube 43 is arranged coaxially inside each element 2. A connector 46 includes a portion placed inside the retainer 44 and having an internal tubular portion 49 adapted to be connected to the coolant tube 43. The connector includes a cylindrical wall portion 40 coaxial of the portion 49 and spaced therefrom. The lower end of this cylindrical wall portion is provided with an axial annular groove 50 receiving a tubular packing 51 which can be inflated by a fluid under pressure supplied through a pipe 52. The retainer 44 can be rotated around the longitudinal axis of the head 3 and is provided with windows 53 through which pipes 47, 48, 52 extend. The pipe 47 is connected to the connector 46 to communicate with the portion 49. The pipe 48 is connected to the connector 46 to communicate with the annular space 40' between the portions 49 and 40. Also extending through the windows 53 are brackets 54 forming part of the connector 46 and secured by screws 55 to the cover 3a. The retainer 44 is secured to the connector 46 by means of a stud 56 and has a square end 57 engageable by the manipulator 8.

When the head 3 is in the operating position illustrated in FIG. 3, coolant enters the connector 46 through the pipe 48 and passes into the fuel element 2 through the annular chamber 40', returning through the tube 43 and the tubular portion 49 of the connector 46 to the pipe 47. The assembly 2, 43 is of the pressure-tube type as shown on page 24 of The Proceedings of the Second United Nations International Conference on the Peaceful Uses of Atomic Energy, vol. 9 Nuclear Power Plants, Part 2, Geneva 1958 and on pages 345 and 444 of International Conference on the Peaceful Uses of Atomic Energy (1955) vol. 2. When an element 2 must be replaced, the coolant supply is stopped, the element 2 is supported from below by the apparatus 17, and the pressure in the pipe 52 is reduced to collapse the packing 51. The retainer 44 is then rotated by the manipulator 8 to disengage the projections 42 from the projections 45. The fuel element 2 is now free for removal in downward direction. After removal of the spent element a new element 2 is inserted by the apparatus 17 and the retainer 44 is rotated to engage the projections 42 of the new element with the projections 45, whereafter the pressure in the pipe 52 is increased to inflate the packing 51.

Another embodiment of a reactor according to the invention is illustrated in FIG. 4 wherein a chamber 6', which is above the moderator unit 1 and in which the connecting heads 3 with the coolant supply pipes are disposed, is separated by a protective top cover consisting of two disc-shaped and individually rotatable members 60, 61 from a chamber 63 in which a drive 64 for a manipulator is disposed. The chamber 63 is provided with a radiation-proof door 65. A fuel-rod-changing apparatus is placed below the moderator unit 1 and comprises a cylinder 66 containing a conventional lifting and lowering mechanism. The cylinder 66 is rockably supported by an arm 67 secured to a disc-shaped shield member 12'. Numeral 68 designates one of a plurality of control rods whose elevation can be adjusted by a conventional mechanism 69.

The operation of the apparatus shown in FIG. 4 is similar to that of the apparatus shown in FIG. 1. The cylinder 66 is moved below the element to be exchanged by rotating the member 12' eccentrically rotatably located in a larger disc-shaped shield member 13', and also rotating the latter. The lifting mechanism in the cylinder 66 is now moved to support the element 2 whereafter the coolant supply is stopped and the corresponding connecting head 3 is released from the fuel element 2 by the manipulator in the manner described with reference to FIG. 3. Thereupon the element 2 is lowered into the cylinder 66. The cylinder 66 is now brought to a slanted position and the members 12', 13' are rotated to move the cylinder 66 into alignment with the axis of the channel 32, whereupon the fuel element is moved into the hollow arm 29 and into the storage chamber 33 in the manner described with reference to FIG. 1. The sequence of operations is reversed to supply a new element to the reactor core. The control rods can be replaced in the same manner.

Figure 5:
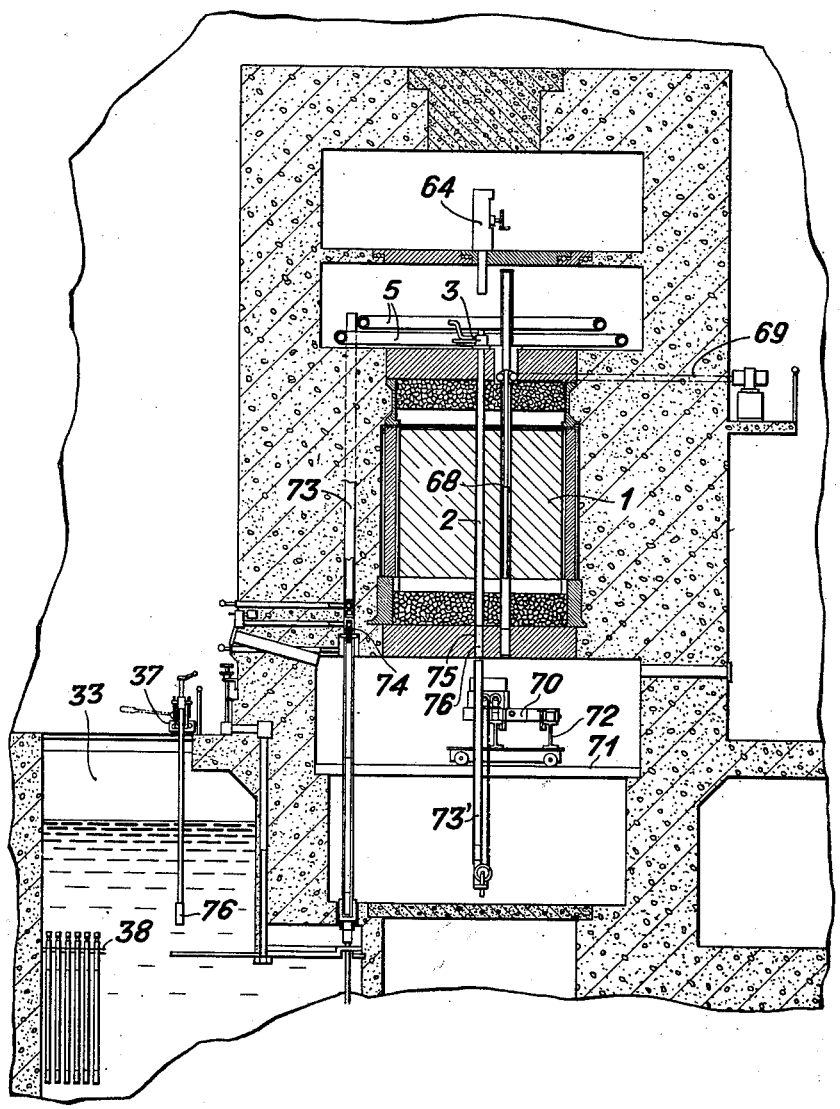
FIG. 5 is a schematic vertical sectional view of a nuclear reactor including another modification of a fuel element changing and transporting apparatus according to the invention.

The apparatus shown in FIG. 5 is similar to the apparatus shown in FIG. 4 except that a fuel rod changing apparatus 70 can travel along two tracks 71, 72 which are normal to one another. Near the moderator unit 1 is a vertical shaft 73 with which a lifting mechanism 74 is associated which is adapted to pick up a fuel element and lower the same into the storage chamber 33. A new fuel element is moved by the lifting mechanism 74 into the shaft 73 and lowered into a cylinder 73' of the changing apparatus 70 wherefrom the fuel element is lifted into the corresponding aperture of the moderator unit 1.

Another difference between this embodiment and the embodiments previously described is that the radiation protection means at the bottom of the reactor core is stationary and relatively rotatable members are omitted. The bottom radiation protection element of the reactor comprises apertures 75 corresponding as to number and location to the apertures for the fuel elements in the moderator block 1. For the sake of clarity only one fuel element 2 and one control rod 68 are shown. There can be no radiation through the apertures 75 because, in this case, the lower end of each fuel element is provided with a part 76 made of a radiation-proof substance which closes the corresponding aperture. This arrangement simplifies the apparatus and the operation thereof.

FIG. 6 illustrates a modified connecting head according to the invention which does not require a special manipulator for seizing and releasing fuel elements and considerably simplifies construction and operation of the reactor. The connecting head comprises a hollow connecting member 80 having legs 81 secured to the cover 3a by means of screws 82. The member 80 comprises a central pipe 85 connected to a tube 86 disposed in the tubular fuel element 2. A pipe 84 is laterally connected to the pipe 85 for supplying coolant thereto or relieving coolant therefrom. An annular space 40' surrounding the pipe 85 is connected to a pipe 83 for coolant flow. A cylindrical guide 87 in which a pin 88 can be moved extends from the top of the member 80. The pin 88 is connected to a plate 90 to which clamping arms 92 are swingably secured by pins 91. The arms 92 have hook-shaped ends 93 adapted to engage in a corresponding annular recess 94 in the fuel element. The legs 81 are provided with guide slots 95 for guiding pins 96 secured in the arms 92. An actuating means in the form of a bellows 97 is disposed between the top surface of the member 80 and the plate 90, the interior of the bellows being connected by a pipe 89 to a source of a pressure fluid, not shown. The lower end of the member 80 is provided with an annular groove containing a packing 99 and adapted to receive an annular protuberance at the upper end of the fuel element 2.

If the pressure of the fluid supplied through the pipe 89 to the interior of the bellows is greater than atmospheric pressure, the plate 90 is lifted and the hook-shaped ends 93 of the arms 92 press the fuel element 2 against the packing 99. To replace the fuel element, the pressure in the pipe 89 is reduced so that the bellows 97 collapses and the plate 90 moves downward and the arms 92, due to the configuration of the slots 95, move down and are subsequently spread apart. During the first phase of this movement the ends 93 of the arms abut the lower edge of the recess 94 in the fuel element and, if by this time the fuel element is not already disengaged from the member 80, the arms force it away from the member 80. Thereupon the fuel element is released from the spreading arms 92. A new fuel element is first moved upward into the correct position, whereupon it is engaged by the arms 92 and pressed against the packing 99 by the upward movement of the plate 90 effected by the inflation of the bellows 97. The fuel element need not be in a particular angular position as is necessary when using a head according to FIG. 3. Since the recess 94 extends all around the fuel element, the latter can be gripped by the holding mechanism in any desired angular position.

The connecting head shown in FIG. 3 may be preferred in cases where a manipulator must be provided for other reasons. The part of the manipulator which operates the connecting head is of very simple design, because it merely must effect a simple rotary movement in one or the opposite direction.

Of course, the described and illustrated connecting heads and all the other devices hereinbefore described must comprise a special interlock to prevent disengagement of the retaining devices 44 or 90–93 from the fuel elements while coolant is being supplied and while the changing apparatus for the fuel elements is not below and does not support the respective fuel element. However, the required interlocks are very simple, because the operation of the devices used in the nuclear reactor according to the invention is also very simple. No interlocking means are shown or described, since they do not form part of the present invention.

The structure of the fuel changing apparatus and of associated parts of the nuclear reactor according to the invention and the operation thereof is simple. Although the apparatus according to the invention is shown in the drawings in a position in which the fuel elements extend vertically and the connecting heads are at the top, the fuel elements may be placed differently, for instance, horizontally. The invention can be applied to a reactor having a moderator made of a solid substance or to a reactor using a liquid substance, for instance, heavy water.

What is is claimed is:

1. In combination with a nuclear reactor of the type comprising moderator means having opposite sides, a plurality of tubular elements extending through said moderator means from one side to the opposite side thereof, each of said tubular elements comprising an outside tube and an inside tube placed inside and spaced from said outside tube, one of said tubes being made of material containing fissionable material, and a coolant flowing through said tubes in opposite directions:

a connecting head placed at one end of each of said tubular elements and permanently placed outside of said moderator means at one of said sides thereof, a cover means at the side of said moderator means where said connecting heads are placed, each of said connecting heads comprising a connecting member made fast on said cover means and forming a coolant inlet disconnectably connected to one of said tubes of the respective tubular element, and a coolant outlet disconnectably connected to the second tube of the respective tubular element, a retaining means operatively associated with each of said connecting members and releasably connected to one of the tubes of the respective tubular elements, and an apparatus placed at the side of said moderator means opposite the side where said connecting heads are placed, said apparatus including means for inserting said tubular elements at said opposite side into said moderator means and presenting said tubular elements to said connecting members for retention thereon by said retaining means and for receiving said tubular elements from said moderator means after release of said retaining means.

2. In the combination defined in claim 1, means for moving said apparatus to individual alignment with said tubular elements, said apparatus including a reciprocatingly movable mechanism including means for individually engaging said tubular elements.

3. In the combination according to claim 2, said apparatus including a container made of radiation-proof material and surrounding said mechanism.

4. In the combination according to claim 3, means for feeding said tubular elements to and for receiving said tubular elements from said mechanism, said apparatus including means for rockably supporting said container and mechanism therein to rock in a plane for selectively aligning said container and mechanism therein with said means for feeding said tubular elements to and for receiving said tubular elements from said mechanism and for placing said mechanism and container in a position for inserting said tubular elements into said moderator means and for receiving said tubular elements from said moderator means.

5. In the combination defined in claim 1, a storage chamber for said tubular elements, and conveying means for transporting said tubular elements between said storage chamber and said apparatus, said conveying means including a hollow arm and means for rockably supporting said arm to rock in a plane for rocking said arm in said plane between a position for receiving a tubular element from and for presenting a tubular element to said apparatus and a position for conveying a tubular element to and for receiving a tubular element from said storage chamber.

6. In the combination defined in claim 1, a storage chamber for said tubular elements, and conveying means for transporting said tubular elements between said storage chamber and said apparatus, said conveying means including a vertical shaft, a mechanism placed therein and including means for lifting and lowering said tubular elements in said shaft, means for receiving a tubular element lifted in said shaft, and means for connecting said last mentioned means to said apparatus for transporting the lifted element to said apparatus and for receiving a tubular element from said apparatus and transporting the received element to said shaft for lowering said element into said shaft.

7. In the combination defined in claim 1 and wherein said retaining means has an annular end portion coaxial of and rotatably surrounding an end of said outside tube, the end of the latter and said end portion of said retaining means being provided with axially engageable, circumferentially spaced, radial protuberances for retaining said outside tube on said connecting member upon axial engagement of said protuberances and for releasing said outside tube from said connecting member upon rotation of said retaining means relative to said outside tube for axial disengagement of said protuberances.

8. In the combination defined in claim 1 and wherein said connecting member has an annular end portion coaxial of said tubular element, an annular axial groove in said end portion, and an inflatable packing placed in said groove, said outside tube having an end portion axially extending into said groove and abutting against said inflatable packing.

9. In the combination defined in claim 1 and wherein said retaining means comprises clamping means movably connected to said connecting member and including means for clampingly engaging the end of said outside tube at which end said connecting means is placed, actuating means being interposed between said retaining means and said connecting member and including means for moving said retaining means relatively to said connecting member, said clamping means and said connecting member including cooperating guide means for pressing said clamping means against said outside tube upon movement of said retaining means in one direction and permitting movement of the clamped outside tube onto said connecting member upon continued movement of said retaining means in said direction and for disengaging said clamping means from said outside tube upon movement of said retaining means in the opposite direction.

10. In the combination set forth in claim 9 and wherein said means for moving said retaining means comprises an inflatable element connected to said connecting member and to said retaining means, conduit means being connected to said inflatable element for conducting a pressure fluid to said inflatable element for inflating said inflatable element for moving said retaining means in one direction and for releasing the pressure fluid from said inflatable element for deflating said inflatable element for moving said retaining means in the opposite direction.

11. In the combination set forth in claim 1, a radiation-proof shield at the side of said moderator means where said apparatus is placed, said apparatus being outside of said shield, said shield having apertures corresponding in number and position to the number and position of said tubular elements, each of the latter being provided with a radiation-proof end portion placed in the respective aperture when the tubular element is in normal operating position.

12. The combination defined in claim 1 wherein said tubular elements are in a vertical position and said connecting heads are on top of said moderator means.

References Cited by the Examiner
UNITED STATES PATENTS

| | | | |
|---|---|---|---|
| 2,634,927 | 4/53 | Smith et al. | 244—135 |
| 2,770,591 | 11/56 | Wigner et al. | 176—31 |
| 2,848,404 | 8/58 | Treshow | 176—44 |
| 2,851,410 | 9/58 | Vernon | 176—31 |
| 2,977,297 | 3/61 | Evans et al. | 176—81 |
| 2,999,059 | 9/61 | Treshow | 176—42 |
| 3,025,226 | 3/62 | Martin et al. | 176—32 |
| 3,039,947 | 6/62 | Fortescue et al. | 176—71 |
| 3,073,771 | 1/63 | Moulin | 176—27 |

OTHER REFERENCES

International Conference on the Peaceful Uses of Atomic Energy (1955), vol. 2, pages 345 and 444.

Proceedings of the Second International Conference on the Peaceful Uses of Atomic Energy (1958), vol. 8, pages 427–429.

CARL D. QUARFORTH, *Primary Examiner.*

REUBEN EPSTEIN, *Examiner.*